Figure 1:
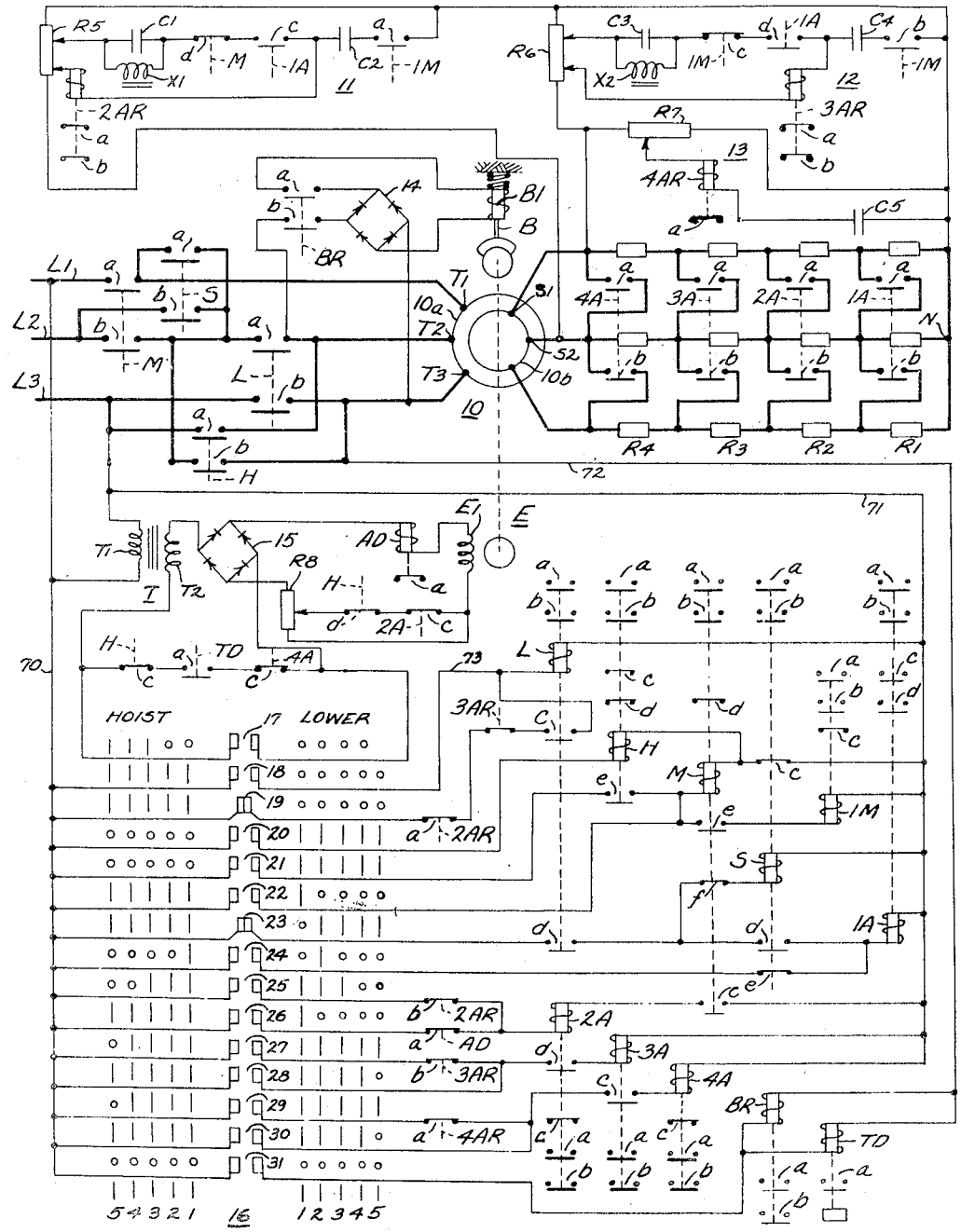

Nov. 15, 1949　　　　J. D. LEITCH　　　　2,488,210
CONTROL SYSTEM FOR AN INDUCTION MOTOR
AND BRAKING GENERATOR COMBINATION
Filed July 20, 1948　　　　　　　　　　2 Sheets-Sheet 1

INVENTOR
JOHN D. LEITCH
BY
his ATTORNEYS

Nov. 15, 1949    J. D. LEITCH    2,488,210
CONTROL SYSTEM FOR AN INDUCTION MOTOR
AND BRAKING GENERATOR COMBINATION
Filed July 20, 1948    2 Sheets-Sheet 2
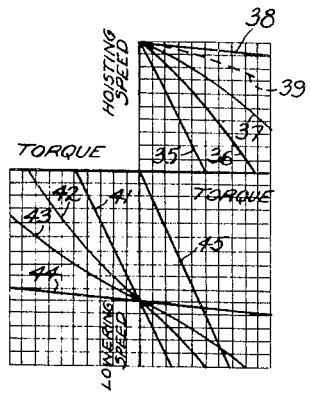
FIG.2
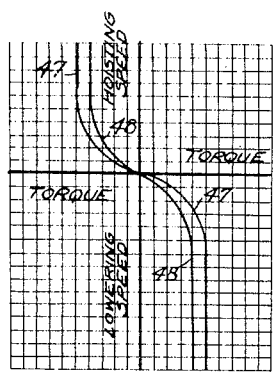
FIG.3
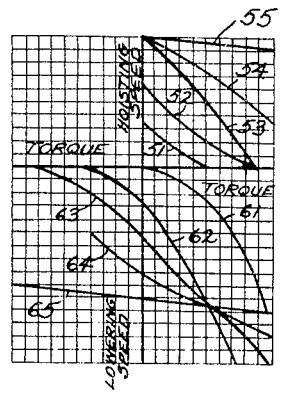
FIG.4
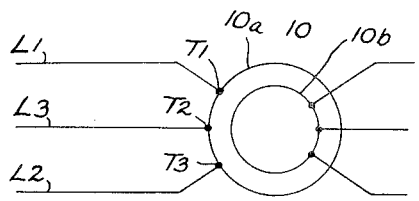
FIG.5
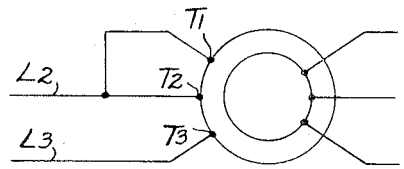
FIG.6
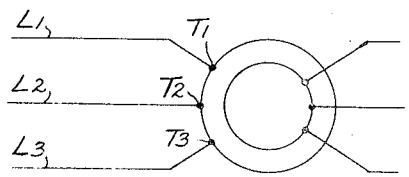
FIG.7
| Device | HOIST | | | | | °F_F | LOWER | | | | |
|---|---|---|---|---|---|---|---|---|---|---|---|
| | 5 | 4 | 3 | 2 | 1 | | 1 | 2 | 3 | 4 | 5 |
| M | O | O | O | O | O | | | O | O | O | O |
| H | O | O | O | O | O | | | | | | |
| L | | | | | | ◐ | O | O | O | O | O |
| S | | | | | | ◐ | O | | | | |
| 1A | O | O | O | O | | ◐ | O | | O | O | O |
| 2A | O | O | | | | | | | | O | O |
| 3A | O | | | | | | | | | | O |
| 4A | O | | | | | | | | | | |
| E | | | | ▼ | ▼ | ◐ | O | O | O | O | ▼ |
| BR | O | O | O | O | O | | O | O | O | O | O |
▼ INDICATES REDUCED EXCITATION
◐ EXCITED TEMPORARILY AFTER
   RETURN FROM LOWER
FIG.8
INVENTOR.
JOHN D. LEITCH
BY John H. Bremond &
Harold J. Rathbun,
his ATTORNEYS Patented Nov. 15, 1949

2,488,210

UNITED STATES PATENT OFFICE 2,488,210

CONTROL SYSTEM FOR AN INDUCTION MOTOR AND BRAKING GENERATOR COMBINATION

John D. Leitch, Shaker Heights, Ohio, assignor to The Electric Controller & Manufacturing Company, Cleveland, Ohio, a corporation of Ohio Application July 20, 1948, Serial No. 39,604

16 Claims. (Cl. 318—210)

This invention relates to systems of control for motor drives in which a polyphase wound rotor induction motor coupled to an artificial load is utilized for apparatus in which the actual load at times overhauls and drives the motor and its artificial load and in which the overhauling load must be retarded to limit its speed. The invention is particularly applicable to hoist applications and is hereinafter described as applied to that use.

Braking generators have been used as artificial loads for wound rotor induction motors driving the hoist motion of cranes to give undersynchronous speed control during hoisting as well as during both power and overhauling lowering. One example of such use of braking generators is disclosed in Electrotechnik und Maschinenbau, vol. 58, No. 11–12, pp. 115–119, March 8, 1940. When used for braking purposes generators of the eddy current type, commonly referred to as "eddy current brakes," possess some advantages, such as simplicity and cost, over D.-C. shunt, series, or compound generators having external load circuits and D.-C. excited squirrel cage machines.

Until recently, eddy current brakes were of limited advantage in hoist applications because of the pronounced decrease in torque with speed after reaching a predetermined maximum torque, as evidenced by the so-called drooping speed-torque characteristics. Recent improvements in the design of eddy current generators or brakes have eliminated the need of auxiliary equipment for preventing the torque of the eddy current brake from decreasing at high speeds. Accordingly, the substitution of the improved eddy current brake for the earlier eddy current brakes, generators, and other equivalent artificial loading means in hoist equipment has resulted in obvious advantages of simplicity and economy. Even so, the improved eddy current brakes leave something to be desired in hoist operations.

For example, the torque output of these improved brakes reaches a predetermined maximum value at a relatively low speed and, while not decreasing, nevertheless, as the speed increases, either does not continuously increase or increase less rapidly than is desirable for most efficient braking in hoist applications. Consequently, since the lowering torque of an overload on a hoist may exceed the full load torque of the motor, safety requires that eddy current brakes having maximum torque ratings in excess of the full load torque of the motor be used if the motor is to be deenergized and the brake alone used for lowering in the slowest speed point. Such excessively large brakes must also be used if the motor is to be connected to provide a small downward torque while lowering at the slowest speed. In addition to the obvious price considerations, it is desirable to use as small a braking machine as possible because the reduced $WR^2$ of the smaller brake rotor permits more rapid hoisting and lowering operations with consequent increased speed in handling materials.

In the improved eddy current braking control system of this invention, the eddy current brake is controlled by simple rheostatic means, yet the torque retarding an overhauling load continues to increase adequately with speed in all lowering speed points. Because of this continuous adequate increase, with speed, of the torque retarding the load, smaller eddy current brakes can be used than have heretofore been required in those hoist equipments which do not include complicated brake excitation control means. Even though a smaller brake is used, the hoist control system of this invention provides slower lowering speeds than have previously been obtained in eddy current braking hoist control systems using eddy current brakes of larger size. These desirable results are accomplished by connecting the motor for unbalanced voltage braking in the slowest lowering speed point.

In other lowering points beyond the first, the motor is connected so as to provide a motor torque for driving both the brake and actual load or to assist the brake by regenerative braking action when retarding an overhauling load at speeds above synchronism.

It is an object of this invention to provide an improved alternating current hoist control system having the operating advantages above described.

A further object is to provide an improved alternating current hoist control system which correlates the characteristics of a wound rotor induction motor and an eddy current brake so as to produce a more efficient hoist equipment.

Another object is to provide an alternating current hoist control system by which the torque of an induction motor at times is caused to oppose and at other times to assist the torque of a braking machine at speeds under synchronism.

Additional objects are to provide interlocking means between an eddy current brake supply circuit and the secondary circuit of an induction motor, and to provide improved means for controlling the off-point braking of a hoist control system.

Other objects and advantages will become apparent from the following description wherein reference is made to the drawings, in which;

Fig. 1 is a wiring diagram illustrating the control system of this invention when connected to a motor and a braking machine such as an eddy current brake, Figs. 2, 3, and 4 are graphs to assist in understanding the invention, Figs. 5, 6, and 7 are wiring diagrams in simplified form showing primary motor connections provided by the control system for hoisting and lowering, and, Fig. 8 is a sequence chart illustrating the operation of the control system of Fig. 1.

Referring to Fig. 1, a polyphase wound rotor induction motor 10 has a primary winding 10a arranged to be supplied with power from supply lines L1, L2, and L3 and has a secondary winding 10b connected to a balanced Y-connected resistance bank having sections R1, R2, R3, and R4 and a neutral point N. The motor 10 is shown as provided with the usual spring-applied, electromagnetically-released friction brake B having an operating winding B1. A suitable power consuming device or artificial load such as the eddy current brake E provided with an exciting winding E1 has its rotor coupled to the motor shaft either directly as indicated in Fig. 1 or by means of a suitable gear train. Although in the preferred embodiment of the invention the braking machine is shown as an eddy current brake, it will be understood that other types of generators and electric or non-electric power consuming devices having suitable speed-torque characteristics, such, for example, as a fluid pressure pump or the newer magnetic brakes utilizing powdered iron suspended in oil, may be used if desired to obtain many of the advantages of this invention.

The control system illustrated in Fig. 1 comprises a plurality of electromagnetic contactors and relays each of which is diagrammatically shown on the drawing. To simplify the drawing, many of the contactor and relay contacts are shown in convenient physical locations in the wiring diagram as well as in conjunction with their respective operating windings.

Power connections for causing the motor 10 to operate in the hoisting direction are completed upon closure of electromagnetic contactors M and H. Contacts a of the contactor M connect the line L1 to a primary motor terminal T1 and contacts a of the contactor H connect the line L3 to a primary motor terminal T2. The line L2 is connected to a remaining primary motor terminal T3 through contacts b of the contactor M and contacts b of the contactor H. The hoisting connections for the primary winding 10a are as shown in Fig. 5.

For lowering it is desired to connect the motor 10 selectively so that it provides either a balanced polyphase motoring torque in the lowering direction or an unbalanced voltage braking torque capable of retarding an overhauling load at speeds under synchronism. Although any suitable unbalanced voltage braking connection may be used, for example, such as one of those disclosed in German Patent No. 570,284, published February 14, 1933, the preferred unbalanced voltage braking connection illustrated in the drawings is the extremely simple single-phase braking connection described and claimed in Wilcox Patent No. 2,233,501, and utilizing the primary connections of Fig. 6.

Power connections for lowering are completed upon closure of an electromagnetic contactor L and selective closure of an electromagnetic contactor S and the contactor M. When the contactors M and L are closed, the motor 10 exerts a balanced polyphase motoring torque in the lowering direction since the line L1 is connected through the contacts a of the contactor M to the terminal T1, the line L2 is connected through the contacts b of the contactor M and contacts a of the contactor L to the terminal T2, and the line L3 is connected through contacts b of the contactor L to the terminal T3. The lowering connections for the primary winding 10a which cause the motor to exert a balanced polyphase motoring torque are as shown in Fig. 7.

Power connections for unbalanced voltage braking during lowering are obtained when the contactor M is open and the contactors S and L are closed. When the contactors S and L are closed, contacts a of the contactor S and the contacts a of the contactor L interconnect the terminals T1 and T2, contacts b of the contactor S connect the line L2 to the interconnected terminals, and the contacts b of the contactor L connect the line L3 to the terminal T3. These unbalanced voltage braking connections for the primary winding 10a are shown in Fig. 6.

Control of the secondary circuit of the motor may be provided by a plurality of electromagnetic contactors 1A, 2A, 3A, and 4A, each having main contacts indicated at a and b for selectively short circuiting resistance sections R1, R2, R3, and R4. The secondary circuit may also include a plurality of speed-responsive, acceleration and braking controlling relay circuits 11, 12, and 13, each of which obtains its operating voltage from the secondary winding 10b. The relay circuits 11, 12, and 13 are described and claimed in Leitch Patent No. 2,165,491 and Myles Patent No. 2,232,257, and a complete description of their operation in a hoist controller may be had from McArthur et al. Patent No. 2,325,413. Hence only a brief description of these relay circuits is included herein.

The relay circuit 11 comprises a relay 2AR having normally closed contacts a and b and also comprises a resistor R5 which is connected between a secondary motor terminal S2 and the neutral point N of the secondary resistance. A parallel-resonant operating circuit for the relay 2AR including the winding of the relay 2AR, normally-open auxiliary contacts c of the contactor 1A, normally-closed auxiliary contacts d of the contactor M, and a parallel combination including a condenser C1 and a reactor X1 is connected between adjustable taps on the resistor R5. A series-resonant operating circuit for the relay 2AR is from the neutral point N through normally open contacts a of an electromagnetic relay 1M, a condenser C2, and the winding of the relay 2AR to a point on the resistor R5.

The relay circuit 12 comprises a relay 3AR having normally closed contacts a and b and also comprises a resistor R6 which is connected between a secondary motor terminal S1 and the neutral point N. A parallel-resonant operating circuit for the relay 3AR including the winding of the relay 3AR, normally-open contacts d of the contactor 1A, normally-closed contacts c of the relay 1M, and a parallel combination including a condenser C3 and a reactor X2 is connected between adjustable taps on the resistor R6. A series-resonant operating circuit for the relay 3AR is from the neutral point N through normally-open contacts b of the relay 1M, a condenser C4, and the winding of the relay 3AR to a point on the resistor R6.

The relay circuit 13 comprises a relay 4AR having normally closed contacts a and also comprises a resistor R7 which is connected in parallel with the resistor R6 between the terminal S1 and the neutral point N. The relay 4AR has its operating winding connected in a series-resonant circuit with a condenser C5 between the neutral point N and an adjustable tap on the resistor R7.

The brake winding B1 is supplied from the direct current side of a rectifier 14 having its alternating current terminals connected across the primary motor terminals T2 and T3. A brake relay BR having normally-open contacts $a$ in the direct current supply to the brake winding B1 and normally-open contacts $b$ in the alternating current supply to the rectifier 14 controls the operation of the brake B.

The winding E1 of the eddy current brake E may be supplied from the direct current side of a rectifier 15 having its alternating current terminals arranged to be connected across a secondary winding T2 of a transformer T having a primary winding T1. The primary winding T1 is connected for energization directly from the power supply lines L1 and L3. The direct current supply circuit for the winding E1 includes the winding of an A.-C./D.-C. interlock relay AD and a resistor R8 which is arranged to have a portion thereof short circuited by a circuit including normally-closed auxiliary contacts $d$ of the contactor H and normally-closed auxiliary contacts $c$ of the contactor 2A. The alternating current supply to the rectifier 15 is controlled by normally-closed auxiliary contacts $c$ of the contactor H, normally-open contacts $a$ of a time delay relay TD, normally-closed auxiliary contacts $c$ of the contactor 4A, and contacts 17 of a master switch 16 which also has contacts 18 through 31. The relay TD closes instantly upon energization but is retarded in opening as by a dash-pot.

In the off position of the master switch 16 the contacts 19 and 23 are closed while all of the other master switch contacts are open. When the master switch 16 is operated in either the hoisting or lowering direction, its contacts are open except as closure thereof is indicated by the circles in horizontal alignment with the contacts, each circle indicating that its horizontally aligned contacts are closed for the respective position of the master switch. Thus for example, the contacts 24 are closed in the last four hoisting positions, are open in the first hoisting position and off position, are closed in the first lowering position, are open in the second lowering position, and are closed in the last three lowering positions.

Before considering the operation of the control system of Fig. 1 in detail, its general functions will be explained with reference to Figs. 2, 3 and 4.

The speed-torque curves of Fig. 2 show the several operating characteristics of the motor 10 that are provided upon manipulation of the master switch 16. The motor 10 operates as indicated by curves 35, 36, 37, and 38 during hoisting, a curve 39 indicating an intermediate hoisting acceleration point. The motor 10 operates as indicated by curves 41, 42, 43, and 44 when connected as in Fig. 7 to exert a motoring torque in the lowering direction. Operation of the motor is as indicated by a curve 45 when it is connected as in Fig. 6 for unbalanced voltage braking.

Curves 47 and 48 in Fig. 3 are speed-torque curves for the eddy current brake E. The curve 47 indicates the operation of the brake E when the winding E1 is excited at its rated voltage, and the curve 48 indicates operation of the brake E when the winding E1 is excited by a reduced voltage. The curves 47 and 48 show that the torque of the eddy current brake is zero at standstill and increases with speed in opposition to the driving torque as the brake motor is driven in the hoisting and lowering directions. A definite maximum torque is produced by the brake E at a predetermined speed below the synchronous speed of the motor 10, the magnitude of the maximum torque and to a lesser degree the exact speed at which it is reached depending upon the voltage impressed on the winding E1.

Fig. 4 shows resultant speed-torque characteristics that are obtained by combining the properly correlated speed-torque characteristics of Figs. 2 and 3 in the manner herein disclosed. The curves of Fig. 4 thus show the operating characteristics of the hoist or the speed-torque relations at the common motor and brake shaft whereas the curves of Fig. 3 show the speed-torque relations of the eddy current brake E alone and the curves of Fig. 2 show the speed-torque relations of the motor 10 alone. In Fig. 4, curves 51, 52, 53, 54, and 55 indicate the operation of the hoist during hoisting operations and likewise the curves 61, 62, 63, 64, and 65 indicate the operation of the hoist during lowering operations. In the first hoisting speed point the motor is connected so as to operate along the curve 35, the brake is connected so as to operate along the curve 48, and the hoist consequently operates as indicated by the curve 51. In the second hoisting position the excitation of the eddy current brake E is unchanged, but the motor 10 is caused to exert the increased torque indicated by the curve 36 so that the curve 52 becomes the resultant curve for the hoist. In the last three hoisting positions the eddy current brake E is deenergized and the motor 10 alone is used to hoist the load. Thus the curves 36, 37 and 38 of Fig. 2 compare exactly with the curves 53, 54, and 55 of Fig. 4.

In the first lowering position the motor 10 is connected for unbalanced voltage braking and the eddy current brake E is fully excited. The hoist now operates as indicated by the curve 61 which is the resultant curve obtained by combining the curve 45 with the curve 47. It should be noted that the curve 61 shows a continuous increase in retarding torque with speed which prevents overspeeding of heavy loads, whereas, if the eddy current brake E alone were energized, the retarding torque would reach a maximum value indicated by the vertical straight line portion of the curve 47 and loads heavy enough to impose a greater torque would run away. In the second lowering position the motor 10 is caused to exert the downward torque indicated by the curve 41 which, when combined with the torque of the brake E indicated by the curve 47, gives the resultant curve 62. In the third lowering position the torque of the motor 10 is again increased as indicated by the curve 42 which, when combined with the curve 47, gives the resultant curve 63. In the fourth lowering position the motor torque is again increased as indicated by the curve 43, but the excitation of the eddy current brake E is now reduced so that the resultant curve 64 is obtained by combining the curve 48 with the curve 43. In the last lowering position the eddy current brake is deenergized and the hoist operates in accordance with curve 65 which is the same as the motor curve 44.

In connection with such braking machines, particularly of the eddy current brake type, the braking effect does not vary in a direct proportion to the moment of inertia of the brake. Instead the moment of inertia decreases much more rapidly with a decrease in size than does the braking effect. Likewise, in the case of the brake there is a disproportionate change in the heat dissipating ability relative to the braking effect, the heat dissipating ability decreases with a decrease in size much less rapidly than the braking effect. Again the heating effect of the motor decreases at a greater rate upon an increase in the secondary resistance than does the braking effect of the motor. Therefore, by the combination and proper correlation of these characteristics of the motor and brake, an adequate braking force is obtained with a concurrent and favorably disproportionate decrease in undesirable overall heating and inertia effects. Thus adequate braking force can be obtained with an economical size brake because of the reduction in the moment of inertia of the brake itself as well as in the heating effects of the motor and the brake. Having obtained this advantage it is apparent that the maximum starting torque which the motor is permitted to exert and which was heretofore limited to some extent, at least economically, by the size of the brake, can be increased and thereby increase the capacity of the crane except insofar as it might be limited by the maximum lifting ability of the crane structure itself. Thus, as set forth in the objects, by the proper correlation of the secondary motor circuit resistance used during unbalanced voltage braking or of other means such as the degree of voltage unbalance, and the maximum torque output of the eddy current brake, and the proper combination thereof with the maximum lifting ability of the crane, a hoist is provided in which the eddy current brake is of economic and otherwise advantageous size, the heating of the motor during braking is materially reduced even to values equal to or below rated full load heating values, and stable slow lowering speeds are obtained during lowering of loads which equal the maximum lifting ability of the crane.

Fig. 8 is a sequence chart which shows how the several contactors and relays and the eddy current brake E respond to manipulation of the master switch 16. A circle in a square means that the respective piece of apparatus is energized and is in its operated condition for that particular speed point.

Considering now the detailed operation of the control system, in the first hoisting position of the master switch 16 the contactors M and H are closed, the relay BR is energized to release the friction brake B, and the eddy current brake E is energized at reduced voltage. The operating circuit for the contactor H is from the line L1 through a conductor 70, the master switch contacts 20, the winding of the contactor H, normally-closed auxiliary contacts c of the contactor S, and a conductor 71 to the line 13. Operation of the contactor H causes closure of its normally-open auxiliary contacts e to complete an operating circuit for the contactor M from the conductor 70 to the conductor 71 through the contacts 21 and the normally-closed contacts c of the contactor S. With the contactors M and H in their closed positions, the motor primary 10a is connected as in Fig. 5 and the motor exerts a hoisting torque. Closure of the contacts b of the contactors M and H connects a conductor 72 to the supply line L2 to complete a circuit from the line L1 through the conductor 70, the master switch contacts 31, and the winding of the relay BR which thereupon operates to close its contacts a and b to effect release of the brake B. Alternating current is supplied to the rectifier 15 to effect energization of the eddy current brake E due to closure of the contacts 17 in a circuit from the transformer secondary winding T2 through the contacts 17 and the rectifier 15 back to the transformer secondary T2. The relay TD operated to close its contacts a concurrently with the operation of the relay BR, but the circuit including the contacts a of the relay TD was opened upon operation of the contactor H. Operation of the contactor H also opens its contacts d so that all of the resistor R8 is inserted in series with the brake winding E1, thus to maintain the excitation of the winding E1 at a value below normal. Direct current flowing in the circuit including the winding E1 causes operation of the relay AD which opens its contacts a in a circuit for the winding of the contactor 2A, but this operation has no effect during hoisting.

Operation of the contactor M also causes closure of its contacts e to complete an obvious operating circuit for the relay 1M. As soon as hoisting power is applied to the primary winding 10a, the relay 4AR moves to its energized position and, when the contacts a and b of the relay 1M close, the relays 2AR and 3AR are connected in their series-resonant circuit and move to their operated positions.

An increased hoisting torque at the motor shaft is obtained upon movement of the master switch 17 to the second hoisting position wherein the contacts 24 are closed to complete an operating circuit for the winding of the contactor 1A through normally-closed auxiliary contacts e of the contactor S. Operation of the contactor 1A causes closure of its main contacts a and b which short-circuit the resistor section R1. Closure of the contacts c and d of the contactor 1A have no effect at this time because the contacts d of the contactor M and the contacts c of the relay 1M are now open.

When the master switch 16 is moved to the third hoisting position, the motor circuits remain the same, but the contacts 17 open to deenergize the eddy current brake E. This causes the speed-torque relations at the motor shaft to be as indicated by the curve 53 of Fig. 4.

When the master switch 16 is moved to the fourth hoisting position, an operating circuit is completed through the contacts 25 and the contacts c of the contactor M for the winding of the contactor 2A depending upon whether or not the normally closed contacts b of the relay 2AR have closed. These contacts close when the speed of the motor 10 is such that transition from the curve 53 to the curve 54 is desirable. Operation of the contactor 2A causes the resistance section R2 to be short-circuited. The motor now operates as indicated by the curve 37 of Fig. 2 and the hoist operates as indicated by the curve 54 of Fig. 4.

Movement of the master switch 16 to the fifth or last hoisting position causes closure of the contacts 27 and 29. When the motor 10 reaches a predetermined speed depending upon the adjustment of the relay circuit 12, the contacts b of the relay 3AR close to complete a circuit for the winding of the contactor 3A through the contacts 27 and now-closed contacts d of the contactor 2A. The contactor 3A thereupon closes its contacts a and b which short-circuit the resistor section R3 to cause the motor 10 to operate along the curve 39 of Fig. 2. The increased torque of the motor 10 results in further acceleration. At a predetermined increased speed the relay 4AR drops out to close its contacts a which complete a circuit through the contacts 29 and now-closed contacts c of the contactor 3A to the winding of the contactor 4A. Operation of the contactor 4A causes all of the resistor sections R1, R2, R3, and R4 to be short circuited and the motor now operates as indicated by the curve 38 and operation of the hoist is as indicated by the corresponding curve 55.

In the first lowering position of the master switch 16, the contactors L, S and 1A are closed, the relay BR is energized to release the friction brake B, and the eddy current brake E is energized preferably at its rated voltage. The operating circuit for the contactor L is through the contacts 18, a conductor 73, the winding of the contactor L to the conductor 71. Operation of the contactor L causes closure of its normally-open auxiliary contacts $d$ which complete a circuit through the contacts 23 and the normally-closed auxiliary contacts $f$ of the contactor M to the winding of the contactor S. Operation of the contactor S causes closure of its normally-open auxiliary contacts $d$ to complete an obvious circuit for the operating winding of the contactor 1A.

Closure of the contactors L and S connects the motor primary winding 10a to the supply lines L2 and L3 as shown in Fig. 6, and closure of the contactor 1A short circuits the resistor section R1 to provide the proper amount of secondary resistance for the desired braking action of the motor 10. In prior systems wherein the single-phase braking connection of Fig. 6 is used to provide the only retarding torque for an overhauling load, the amount of secondary resistance is generally selected to provide the maximum possible braking action throughout the undersynchronous speed range. In the system of Fig. 1, however, the eddy current brake also provides a torque retarding an overhauling load while the motor 10 is connected for single-phase braking, and consequently the retarding torque of the motor may be reduced. This latter retarding torque is reduced in the present example by increasing the amount of effective secondary resistance which also results in reduced heating of the motor. By proper correlation of the size and degree of excitation of the brake E and amount of secondary resistance that is effective in the motor circuit, not only is a highly desirable first point lowering speed-torque curve obtained but also, at the same time, the motor heating and inertia of the brake rotor are individually reduced a favorably disproportionate amount relative to the decrease in the respective braking torques produced by the motor and brake.

The relay 4AR is also energized during lowering but performs no function. Closure of the contacts $c$ and $d$ of the contactor 1A connects the relays 2AR and 3AR in their respective parallel-resonant circuits including the condensers and reactors C1 and X1 and C3 and X2, respectively. The relays 2AR and 3AR either remain in their deenergized positions or are returned thereto as soon as the motor 10 starts to accelerate since they can now be energized above their pick-up value only while the motor is substantially at rest. Closure of the contacts $b$ of the contactor L connects the conductor 72 to the supply line L3 so that the relays BR and TD move to their operated positions upon closure of the contacts 31. Operation of the relay BR effects release of the friction brake B and operation of the relay TD completes a circuit from the transformer secondary winding T2 to the rectifier 15 through the contacts $c$ of the contactors H and 4A. Since the contacts $d$ of the contactor H and the contacts $c$ of the contactor 2A are closed, a portion of the resistor R8 is short-circuited and the eddy current brake E is fully energized.

As soon as direct current flows to the winding E1, the relay AD operates to open its contacts $a$ which prevents closure of the contactor 2A in subsequent lowering positions by a circuit extending through the contacts 26. In event of a failure of power supply for the eddy current brake E while the master switch 16 is in any lowering position except the first, the relay AD closes its contacts $a$ to complete the circuit for the contactor 2A through the contacts 26. With contactor 2A closed, the motor 10 operates as indicated by the curve 43 of Fig. 2 and it is impossible for the motor 10 to reach an excessive speed due to an overhauling load. If desired contacts of a speed responsive relay may be connected in series with the contacts $a$ of the relay AD to make the safety circuit also speed-responsive. For example, for this purpose, the contacts $b$ of the relay 2AR can be connected in series with both the contacts 25 and 26 instead of in series with the contacts 25 alone.

In the second lowering position the contactors S and 1A open due to opening of the contacts 23 and the contactor M closes due to the closure of the contacts 22. The motor 10 is now connected for lowering as indicated in Fig. 7 and the brake E remains fully energized. Closure of the contactor M completes the previously traced operating circuit for the relay 1M. Closure of the relay 1M and opening of the contactor 1A connects the relays 2AR and 3AR in their series-resonant operating circuits as during hoisting and these relays move to their operated positions. Upon deenergization of the contactor 1A all of the resistor sections R1, R2, R3 and R4 are inserted in the motor circuit and the motor exerts a weak lowering torque as indicated by the curve 41 of Fig. 2 which when combined with the curve 47 of Fig. 3 gives the resultant hoist operating curve 62.

Movement of the master switch 16 to the third lowering position recloses the contacts 24 so as to cause the contactor 1A to reclose thereby to increase the motor torque as indicated by the curve 42.

In the fourth lowering position, if the motor has accelerated to a speed causing drop-out of the relay 2AR, a circuit is completed through the contacts 25, the contacts $b$ of the relay 2AR, the winding of the contactor 2A, and the contacts $c$ of the contactor M to the conductor 71. Operation of the contactor 2A short-circuits the resistance sections R2 and increases the motor torque to the value indicated by the curve 43. Also upon operation of the contactor 2A, its contacts $c$ open to insert all of the resistor R8 in series with the eddy current brake winding E1. The brake E now exerts the reduced torque indicated by the curve 48 and the hoist operates as indicated by the curve 64 of Fig. 4.

Movement of the master switch 16 to the fifth or last lowering position completes an operating circuit for the contactor 3A through the contacts 28 and the now-closed contacts $d$ of the contactor 2A. Upon operation of the contactor 3A, its contacts $c$ close to complete a circuit through the contacts 30 for the contactor 4A which responds to short-circuit by its contacts $a$ and $b$ all of the resistor sections R1, R2, R3 and R4. Operation of the contactor 4A also opens its contacts $c$ which effect deenergization of the eddy current brake E, the other alternating current circuit for the brake E having been opened at the contacts 17 upon movement of the master switch 16 to the fifth lowering position.

If the master switch 16 is returned to the off position from any lowering position, the relays 2AR and 3AR remain in their deenergized positions to hold the contactor L closed through the contacts 18 and contacts c of the contactor L until the motor comes to rest. This is because when the master switch 16 enters the first lowering position the relay 1M opens and the contactor 1A closes to connect the relays 2AR and 3AR in their respective series-parallel resonant circuits. When the contactor L is closed, the contactors S and 1A are likewise closed and the motor 10 exerts unbalanced voltage braking until standstill occurs. The energizing circuits for the contactors S and 1A are maintained in the off position through the contacts 23 until the contactor L opens. When the motor approaches standstill, one or the other of the relays 2AR and 3AR pick-up to deenergize the contactors L, S and 1A. Before the master switch 16 reaches the off-point, the contacts c of the contactor 4A reclose, and the alternating current supply to the rectifier 15 remains completed after the contacts 17 open by a circuit through the contacts a of the relay TD and the contacts c of the contactors H and 4A. When the master reaches the off point, the contacts 31 open to deenergize the relays BR and TD. Opening of the relay BR permits the friction brake B to be applied. The relay TD remains in its energized position for a time interval so that the eddy current brake E remains effective. Preferably, the time of the relay TD should be slightly longer than the time required to decelerate a maximum load from its maximum speed. When the relay TD drops out, its contacts a open to disconnect the rectifier 15 from the transformer T. The "off point" braking control arrangement just described insures that maximum retarding force is applied to the load when the master switch is returned from a lowering position to the "off" position, and that the unbalanced voltage braking connections remain completed only until the motor comes to rest and the eddy current brake remains energized only for a long enough period to assist in bringing the heaviest load to a full stop.

I claim:

1. The combination with an electric motor drive and control system for hoists and the like subject to overhauling descending loads and including a polyphase induction motor arranged to drive and be driven by descending loads selectively, and control means movable to a predetermined position and when in said predetermined position operative to connect said motor to a source of power for dynamic braking whereby said motor exerts a retarding torque on descending loads at speeds under synchronism, of electrical braking means operative when energized to produce a braking torque which increases with speed and mechanically coupled to said motor for driving thereby when the motor is driven by said descending loads, and means rendered operative by movement of the control means to said predetermined position to energize said braking means.

2. The combination with an electric motor drive and control system for hoists and the like subject to overhauling descending loads and including a polyphase induction motor having primary and secondary windings and arranged to drive and be driven by descending loads selectively, means operable to connect said primary winding to a source of power for applying voltages thereto, and voltage unbalancing means operable to cause said voltages to become unbalanced and thereby cause said motor to exert a retarding torque on descending loads, of a braking means the braking torque of which increases with speed coupled to said motor and arranged to be driven thereby and by descending loads, and means operative during operation of said voltage unbalancing means to cause said braking means to exert a braking torque on said loads.

3. The combination of claim 2 characterized in that said voltage unbalancing means unbalances the voltages by the application of single-phase voltage to said primary winding and the connection of a portion of said primary winding in a closed loop circuit of relatively low resistance.

4. The combination with an electric motor drive and control system for hoists and the like subject to overhauling and non - overhauling loads, selectively, and including a polyphase induction motor arranged to drive non-overhauling loads downwardly and to be driven by overhauling loads, a braking means coupled to said motor and arranged to be driven thereby and by said overhauling loads, circuit means operable for connecting said motor to a source of power to cause said motor to drive said loads downwardly, and means operable, during operation of said circuit means, for causing said braking means to exert a braking torque on said motor and loads, of switch means operative to render said circuit means inoperative and concurrently to connect said motor to said source of power in a manner to cause said motor to exert a retarding torque on said loads while said braking means is exerting said braking torque.

5. The combination of claim 4 characterized in that said switch means includes a means for unbalancing the voltages applied to the motor.

6. The combination of claim 5 characterized in that said last mentioned means operates to unbalance the voltages by applying a single-phase voltage to said primary winding and connecting a portion of said primary winding in a closed loop circuit of low resistance.

7. An electric motor drive and controller combination for hoists and the like subject to overhauling descending loads comprising a polyphase induction motor arranged to drive loads upwardly and downwardly, selectively, and to be driven by descending loads, a braking means the braking torque of which increases with speed coupled to said motor and driven thereby and by said descending loads, reversing means operable to connect said motor to a source of power for causing said motor to hoist said loads and to drive said loads downwardly, selectively, said reversing means including lowering control means operable to connect said motor to the source of power in a manner to cause said motor to exert a retarding torque on a descending load at speeds under synchronism, brake control means operable to render said braking means operative and inoperative, selectively, when said motor is connected to hoist said loads and when said motor is connected to drive said loads downwardly, and said brake control means including means operative to render said braking means operative whenever said lowering control means is operative.

8. A controller comprising the controller elements of the combination of claim 7 and related to each other as therein defined characterized in that said elements are specifically arranged and adapted to be combined with the motor and braking means of said combination in the manner therein recited and, when so combined with said motor and braking means, to complete the combination of claim 7.

9. A hoist control system comprising reversing means adapted to be combined with a polyphase induction motor arranged to drive loads and to be driven by descending loads selectively and coupled to a braking means the braking torque of which increases with speed and when combined, operable to connect said motor to a source of power for causing said motor to hoist said loads and to drive said loads downwardly, selectively, said reversing means including lowering control means operable when the reversing means is so combined, to connect said motor to the source of power in a manner to cause said motor to exert a retarding torque on a descending load at speeds under synchonism, and brake control means adapted to be combined with said braking means and when so combined to render said braking means operative and inoperative, selectively, while said motor is connected to hoist said loads and while said motor is connected to drive said loads downwardly, said brake control means including means operative, when the brake control means is so combined, to render said braking means operative whenever said lowering control means is operative.

10. A control system for hoists powered by a polyphase induction motor arranged to drive loads and to be driven by descending loads, selectively, and coupled to a braking means the braking torque of which increases with speed, said control system comprising reversing means operable to connect the motor to a source of power for causing the motor to hoist said loads and to drive said loads downwardly, selectively, said reversing means including lowering control means operable to connect the motor to the source of power in a manner to cause the motor to exert a retarding torque on a descending load at speeds under synchronism, brake control means operable to render said braking means operative and inoperative selectively when the motor is connected to hoist said loads and when the motor is connected to drive said loads downwardly, and said brake controll means including means operative to render said braking means operative whenever said lowering control means is operative.

11. The control system of claim 10 characterized in that said lowering control means operates to connect said motor for unbalanced voltage braking thereby to cause said motor to exert a retarding torque on a descending load at speeds under synchronism.

12. A control system for a wound rotor induction motor having an external secondary circuit and subject to an overhauling load and coupled to a braking generator excited through a D.-C. circuit from a rectifier supplied from an A.-C. circuit which also supplies the motor, comprising a secondary resistance for connection in said secondary circuit, magnetic means operable to reduce said resistance thereby to limit the maximum speed of the motor when driven by said overhauling load, and means interposed in said D.-C. circuit and operative upon cessation of the flow of current in said D.—C. circuit for operating said magnetic means.

13. A control system for a wound rotor induction motor and a braking generator coupled to the motor comprising manually operable control means selectively movable from an off position to an operating position through a braking position, means operative upon movement of said manual means to said braking position for completing braking connections to cause said motor to exert a braking torque and for effecting energization of said generator, and means rendered operative upon movement of said manual means to said operating position for causing said motor to exert a motor torque while said generator remains excited, said control means including switch means operative to effect deenergization of said motor and generator when said control means is returned to said off position from said braking position, speed responsive means responsive to the speed of said motor for delaying the operation of said switch means for maintaining said motor braking connections after said control means is returned to said off position and until said motor comes to rest, and a time delay means rendered operative upon movement of said control means to said off position to cause said switch means to maintain said generator excited for a predetermined time interval.

14. A control system for a three-phase wound rotor induction motor comprising means operable to interconnect two of its primary terminals and to apply single-phase power between the interconnected terminals and the remaining terminal, means operative upon operation of the first means to increase the secondary resistance of the motor to a value in excess of the value that would produce maximum braking action throughout the under-synchronous speed range and to a value such that the heating produced by the unbalanced operation is reduced to the neighborhood of rated full load heating of the motor for a particular duty cycle, an eddy current brake coupled to the motor, and means operative upon operation of the first means to excite said brake to such a degree that the brake produces a braking torque at least as great as the torque reduction below said maximum value resulting from the increase in the secondary resistance.

15. The combination of claim 4 characterized in that said braking means is an electric generator.

16. The combination of claim 15 characterized in that said generator produces said braking torque due to eddy currents induced therein.

JOHN D. LEITCH.

REFERENCES CITED

The following references are of record in the file of this patent:

UNITED STATES PATENTS

| Number | Name | Date |
|---|---|---|
| 2,165,491 | Leitch | July 11, 1939 |
| 2,232,257 | Myles | Feb. 18, 1941 |
| 2,233,501 | Wilcox | Mar. 4, 1941 |
| 2,325,413 | McArthur et al. | July 27, 1943 |

FOREIGN PATENTS

| Number | Country | Date |
|---|---|---|
| 570,284 | Germany | Feb. 14, 1943 |